US009033132B2

(12) United States Patent
Goeb

(10) Patent No.: US 9,033,132 B2
(45) Date of Patent: May 19, 2015

(54) COMPACT CAN TRANSFER SYSTEM

(75) Inventor: Claude Goeb, Pattaya (TH)

(73) Assignee: MALL + HERLAN GMBH, Pfinztal (DE)

( * ) Notice: Subject to any disclaimer, the term of this patent is extended or adjusted under 35 U.S.C. 154(b) by 7 days.

(21) Appl. No.: 13/591,776

(22) Filed: Aug. 22, 2012

(65) Prior Publication Data

US 2013/0056331 A1    Mar. 7, 2013

(30) Foreign Application Priority Data

Aug. 25, 2011    (DE) .......................... 10 2011 081 590

(51) Int. Cl.
*B65G 47/84*    (2006.01)
(52) U.S. Cl.
CPC ............... *B65G 47/848* (2013.01); *B65G 47/84* (2013.01); *B65G 2201/0235* (2013.01)
(58) Field of Classification Search
CPC .... B65G 47/846; B65G 47/84; B65G 47/848; B65G 2201/0235
USPC ................................................. 198/608, 610
See application file for complete search history.

(56) References Cited

U.S. PATENT DOCUMENTS

| 4,823,536 A * | 4/1989 | Manservigi et al. ............. 53/466 |
| 5,111,742 A * | 5/1992 | DiDonato et al. ............... 101/40 |
| 5,232,717 A | 8/1993 | Voss |
| 5,613,593 A * | 3/1997 | Gerber ......................... 198/479.1 |
| 5,730,048 A * | 3/1998 | Averill et al. ..................... 101/37 |
| 6,015,040 A * | 1/2000 | Goeb et al. ...................... 198/438 |
| 7,311,515 B2 * | 12/2007 | Netsu ............................ 425/534 |
| 8,307,977 B2 * | 11/2012 | Nguyen et al. ............. 198/803.9 |
| 2009/0183970 A1 * | 7/2009 | Ramminger ............... 198/471.1 |
| 2011/0151047 A1 * | 6/2011 | Borgatti et al. ............... 425/526 |

FOREIGN PATENT DOCUMENTS

| DE | 43 14 142 | 7/1994 |
| DE | 196 54 350 | 6/1998 |
| EP | 1132207 | 9/2001 |
| FR | 2 515 153 | 4/1983 |
| FR | 2 660 295 | 10/1991 |
| WO | 01/44084 | 6/2001 |

* cited by examiner

*Primary Examiner* — Gene Crawford
*Assistant Examiner* — Thomas Randazzo
(74) *Attorney, Agent, or Firm* — Ware, Fressola, Maguire & Barber LLP

(57) ABSTRACT

A transfer device comprising a mandrel wheel; and a transfer wheel, respectively driven to rotate about rotation axes that are parallel to one another and which respectively include supports in their peripheries for objects to be imprinted or processed otherwise, wherein a distance of the supports at the mandrel wheel from a rotation axis of the mandrel wheel is variable between a minimum distance and a maximum distance, and the mandrel wheel and the transfer wheel are arranged adjacent to one another so that objects are transferrable from a transport device through the transfer wheel to a respective support at the mandrel wheel or vice versa from the mandrel wheel through the transfer wheel to a transport device, wherein the supports are respectively attached to the transfer wheel through a transfer pivot arm so that they are pivotable about a pivot axis.

14 Claims, 19 Drawing Sheets

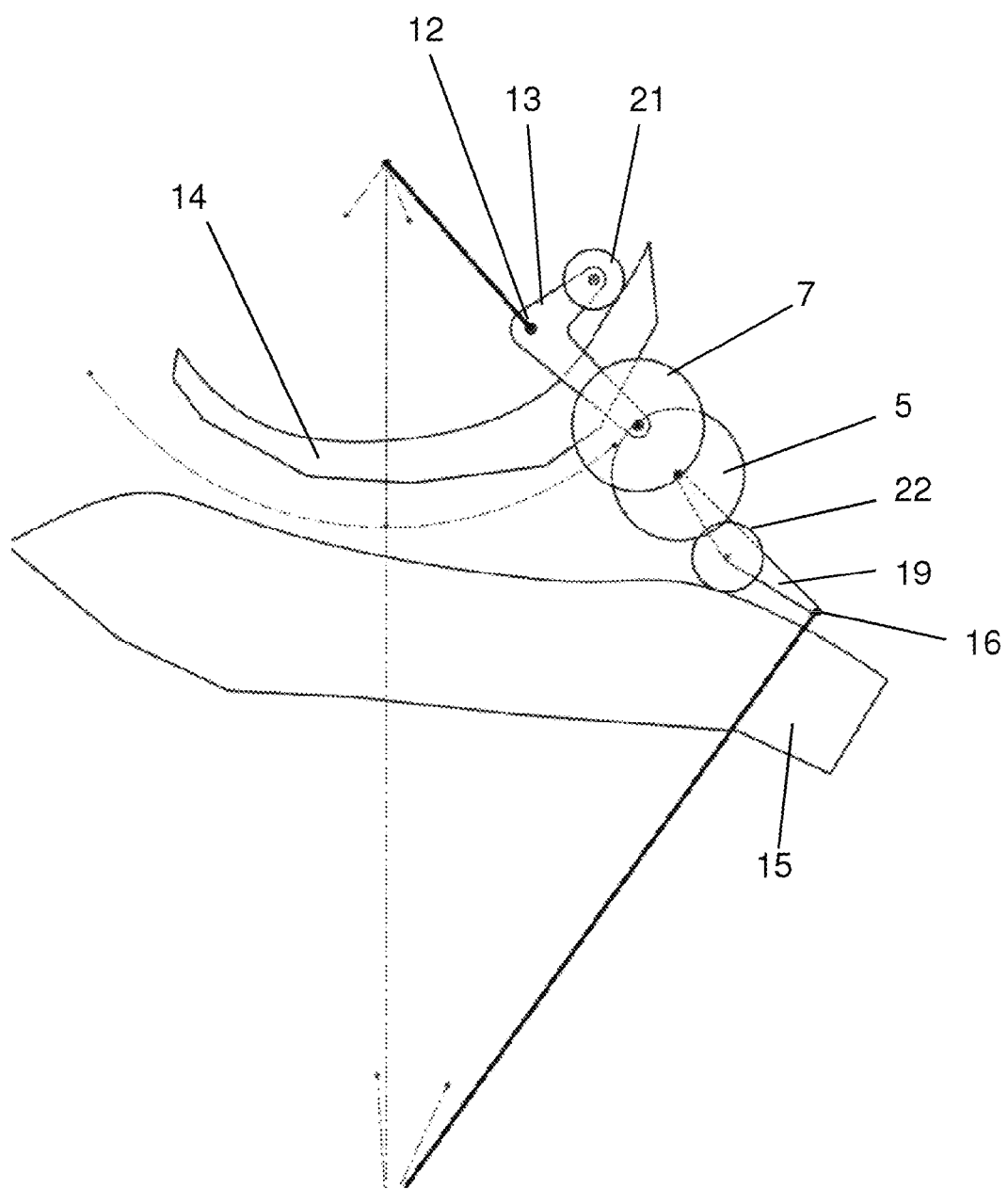

COMPACT CAN TRANSFER SYSTEM

CROSS REFERENCE TO RELATED APPLICATIONS

This application claims priority under 35 USC §119 to German Patent Application No. 10 2011 081 590.2 filed on Aug. 25, 2011, which application is hereby incorporated by reference.

TECHNICAL FIELD

The invention relates to a transfer device with a mandrel wheel and a transfer wheel respectively driven so that they rotate about rotation axes that are parallel to one another in order to transfer objects from a transport device through the transfer wheel to supports at the mandrel wheel or vice versa, from the mandrel wheel through the transfer wheel to a transport device.

The objects to be transferred are for example cans or other cylindrical hollow elements with bases.

BACKGROUND OF THE INVENTION

Transfer devices are known whose mandrel wheel and transfer wheel are arranged adjacent to one another and which include receiving mandrels or supports in their periphery for objects to be imprinted or processed in another manner, wherein the receiving mandrels are respectively connected with the mandrel wheel and the supports are connected with the transfer wheel and the distance of the receiving mandrels from the rotation axis of the mandrel wheel is variable between a minimum distance and a maximum distance.

During their processing, objects to be processed, for example aerosol cans, aluminum bottles or other hollow elements or containers run through plural processing stations. The transport along the processing stations which perform among other things priming, imprinting, decorating or lacquering is performed through a transport device. For a transport device, typically a continuously moving chain conveyor is used which is configured with retaining rods that protrude in lateral direction and are offset from one another with a fixated pitch T1, wherein the retaining rods carry the objects. When an object reaches a printing station, it has to be transferred from the chain conveyor through a first transfer wheel to a continuously rotating mandrel wheel associated with the printing station and has to be moved back after the printing process has been performed from the mandrel wheel through a second transfer wheel to the chain conveyor. A typically larger pitch T2 of the mandrel wheel that differs from the pitch T1 of the chain conveyor is predetermined by the distance of the receiving mandrels required for the printing station, wherein the distance is measured in circumferential direction of the mandrel wheel. The pitches T1 and T2 that differ from one another cause different feed velocities of the objects on the chain conveyor and mandrel wheel and therefore have to be compensated when moving the objects from the chain conveyor to the mandrel wheel and/or from the mandrel wheel to the chain conveyor on a transfer path. This pitch compensation is facilitated in that the supports at the transfer wheel and the receiving mandrels at the mandrel wheel are movably supported.

EP 1 132 207 B1 describes a transfer device with a mandrel wheel and a transfer wheel in which the supports and the receiving mandrels are respectively attached at the transfer wheel or the mandrel wheel through a linear support for pitch compensation. The transfer path is a straight line, wherein the rotation axes of the mandrel wheel or the transfer wheel respectively have the same perpendicular distance from the transfer path. A common conveying speed on the transfer path between the mandrel wheel and the transfer wheel is facilitated through driving them with identical speeds. The number of the supports or receiving mandrels attached at the transfer wheel and the mandrel wheel are therefore identical.

Prior art transfer devices therefore have the advantage that due to the recited kinematic- and engineering features (straight transfer path, identical orthogonal distance, identical drive speed, and identical number of supports or receiving mandrels), the transfer wheel and the mandrel wheel have similar sizes. Thus, the compactness of the transfer device is limited.

SUMMARY OF THE INVENTION

Thus it is an object of the present invention to provide an alternative transfer device which has less space requirement.

This object is achieved through a device in which the mandrel wheel and the transfer wheel are respectively driven to rotate about rotation axes that are parallel to one another and wherein the mandrel wheel and the transfer wheel respectively have supports in their peripheries for objects to be imprinted or processed otherwise, wherein the distance of the supports at the mandrel wheel from the rotation axis of the mandrel wheel is variable between a minimum distance and a maximum distance. The mandrel wheel and the transfer wheel are arranged adjacent to one another so that objects are transferrable by a transport device through the transfer wheel to a respective support at the mandrel wheel or vice versa from the mandrel wheel through the transfer wheel to a transport device.

The supports are respectively attached at the transfer wheel so that they are pivotable about a pivot axis through a transfer pivot arm, wherein the pivot axis extends parallel to the rotation axis of the transfer wheel and the pivot axis has the same fixated distance from the rotation axis for each of the supports.

The solution according to the invention includes the finding that a substantially tangentially movable attachment of the supports at the transfer wheel facilitates an approximation of the pitches of the respective supports in the transfer portion through tangential compensation movements that is required for transferring objects from the transfer wheel to the mandrel wheel and vice versa. The pivot arms provided for this purpose represent a practical solution, though not the only solution, to implement compensation movements of this type, mostly in tangential direction and thus facilitate approximating the pitches through respective temporary changes of the angle pitch at the transfer wheel.

Thus the solution according to the invention has the advantage that a pitch compensation on the transfer path between the transfer wheel and the mandrel wheel can be achieved through a tangential relative movement of a transfer pivot arm of the transfer wheel. Thus, a transfer wheel can be configured significantly smaller than the mandrel wheel which yields a particularly compact configuration of the transfer device.

The solution according to the invention can be supplemented with additional advantageous embodiments. Some of the embodiments are described infra.

Thus a maximum distance of the supports from the rotation axis of the transfer wheel can be smaller than the minimum distance of the receiving mandrels from the rotation axis of the mandrel wheel.

For a particularly space saving configuration of the transfer device, the number of supports at the transfer wheel can be smaller than the number of receiving mandrels at the mandrel wheel in a particularly advantageous embodiment. A smaller number of supports at the transfer wheel leads to lower compressed air and vacuum requirements.

For optimum space utilization in an advantageous embodiment of the transfer device according to the invention, the pivot axes of the transfer pivot arms can be evenly distributed at the transfer wheel on a circle about the rotation axis of the transfer wheel.

In an advantageous embodiment, the supports at the mandrel wheel are respectively connected with the mandrel wheel through a mandrel pivot arm whose pivot axis extends parallel to the rotation axis of the mandrel wheel and has the same fixated distance from the rotation axis of the mandrel wheel for each receiving mandrel at the mandrel wheel, wherein the mandrel pivot arms at the mandrel wheel cause/facilitate a movement of the receiving mandrels attached at the mandrel pivot arms along a circular path between their minimum distance and their maximum distance from the rotation axis and thus cause/facilitate a movement in a substantially radial direction.

For reasons of ease of manufacture, attaching the supports at the mandrel wheel respectively at a straight line guide can be advantageous. In an alternative embodiment, the supports can be attached at the mandrel wheel respectively at a straight line guide whose longitudinal axis extends transversal to the rotation axis of the mandrel wheel, wherein the straight line guides facilitate moving the supports attached at the straight line guides at the mandrel wheel between a minimum distance of the supports and a maximum distance of the supports from the rotation axis along a straight line guide path.

In a particularly advantageous embodiment, a support at the transfer wheel transferring an object and a support at the mandrel wheel receiving an object pass through a common path curve section in the transfer portion. This common path curve section describes the transfer- or joint path. The joint path curve section is passed through at an identical path velocity. The jointly traveled path curve section is circular or approximately circular. In this embodiment, the transfer wheel can be arranged proximal to the mandrel wheel. This facilitates a particularly compact configuration of the transfer device.

In another advantageous embodiment, the transfer device can include control devices which cause a transferring support at the transfer wheel and an object receiving support at the mandrel wheel to pass through a common path curve section in a transfer portion at identical path velocity, wherein the path curve section is circular or approximately circular.

In order to achieve particularly robust control, a first control curve that is fixated to the frame can be associated with the transfer wheel and a respective control curve follower can be associated with the transfer pivot arms of the transfer wheel, so that the frame fixated control curve and the control curve follower cause a movement of the supports attached to the transfer pivot arms along a support path that is closed around the rotation axis through the rotation of the transfer wheel about its rotation axis.

By the same token, a second control curve that is fixated to the frame can be advantageously associated with the mandrel wheel and a respective control curve follower can be associated with the mandrel pivot arms of the mandrel wheel, so that the control curve that is fixated to the frame and the control curve follower cause a movement of the supports attached to the mandrel pivot arms along a receiving mandrel path that is closed around the rotation axis through the rotation of the mandrel wheel about its rotation axis.

In an advantageous embodiment, the supports can be configured at the transfer wheel and/or the supports can be configured at the mandrel wheel, wherein the supports suck an object in through vacuum and/or expel the object through compressed air.

In order to provide a cost-effective and low maintenance embodiment for the transfer device, the supports can respectively have an opening at the transfer wheel which opening is configured for supplying compressed air and/or vacuum. Accordingly, the supports at the mandrel wheel can respectively have an opening which is configured for supplying compressed air and/or vacuum. The opening can be configured as a borehole or as another recess provided for feeding compressed air and/or vacuum.

In a particularly advantageous embodiment, a supply of compressed air and/or vacuum to the supports at the transfer wheel can be provided through the respective pivot axis of the support. A compressed air/vacuum supply to the supports at the mandrel wheel can also be provided through their pivot axes through the rotation point. A compressed air-/vacuum-supply through a pivot axis or through a rotation point of a support at the transfer wheel and/or a support at the mandrel wheel is advantageous since no hoses are required that are loaded in a bending direction.

In another advantageous embodiment, the supports at the transfer wheel can respectively be movably supported along an axis that respectively extends parallel to its pivot axis. In another advantageous embodiment, the transfer device can include thrust control devices which cause the supports at the transfer wheel to be respectively deflected along an axis that extends parallel to their pivot axis. The amount of the deflection can be a function of a rotation angle of the transfer wheel. The minimum amount of the deflection of a respective support at the transfer wheel essentially depends from the length of the received object along its receiving axis.

In an alternative embodiment, a third control curve that is fixated at the frame can be associated with the mandrel wheel and a respective control curve follower can be associated with the straight line guide of the mandrel wheel, so that the control curve that is fixated at the frame and the control curve follower through the rotation of the mandrel wheel about its rotation axis cause a movement of the support attached to the straight line guide at the mandrel wheel along a closed path about the rotation axis.

In a particularly advantageous embodiment, the transfer device can include two transfer wheels. The first transfer wheel is used for transferring an object to be processed from a transport device to a mandrel wheel, wherein the mandrel wheel is associated with a processing station, the second transfer wheel is used for transferring the object to be processed from a mandrel wheel back to the transport device.

Subsequently, the invention is described with reference to the embodiments illustrated in drawing figures, wherein the different features like in the embodiments described supra can be randomly combined with one another, wherein:

BRIEF DESCRIPTION OF THE DRAWINGS

FIG. 5a-d schematically illustrate various snapshots for depicting the movement of the transfer supports and the receiving mandrel in the transfer portion;

DETAILED DESCRIPTION

Figure 1:
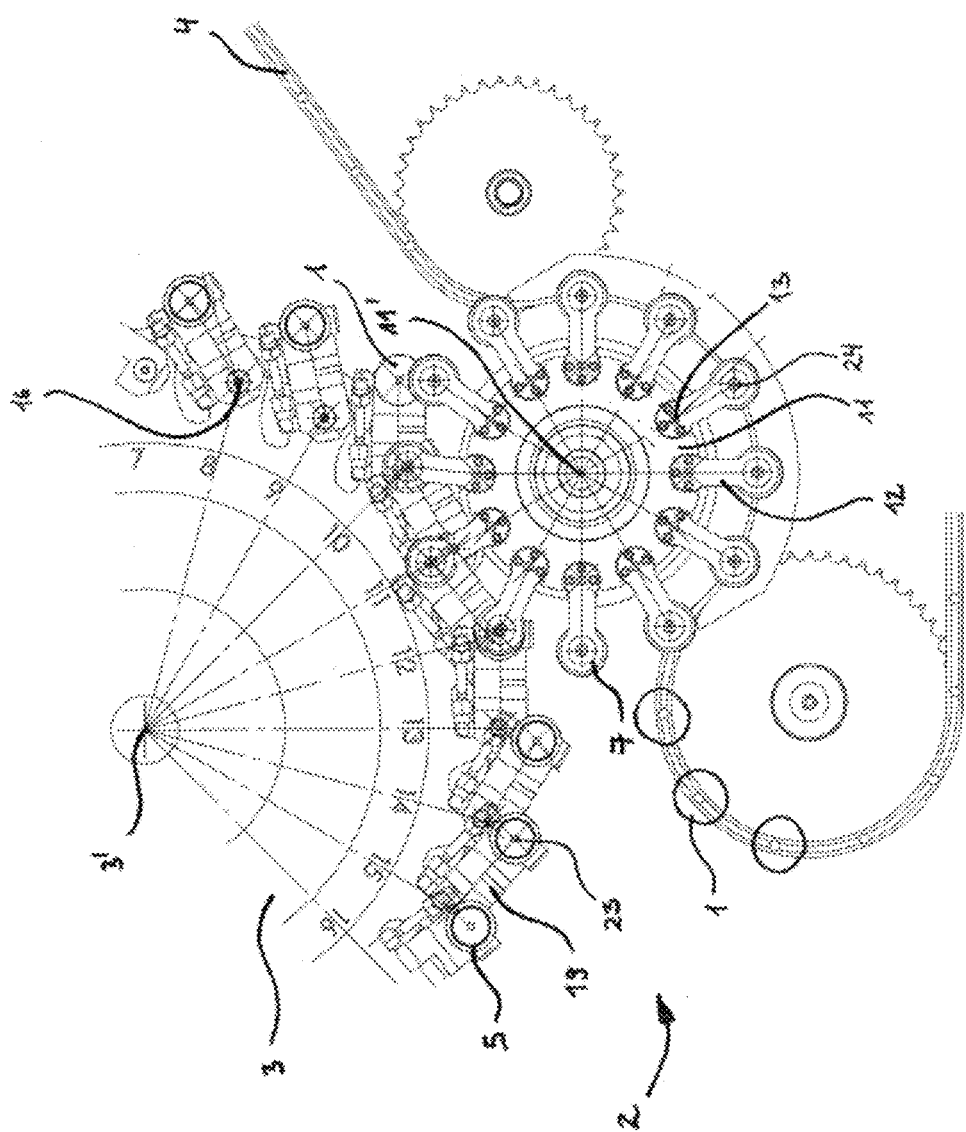
FIG. 1 schematically illustrates an exemplary embodiment of a transfer device according to the invention, wherein the transfer wheel includes a transfer pivot arm and the mandrel wheel includes a mandrel pivot arm.

A transfer device 2 in FIG. 1 includes a mandrel wheel 3 and a transfer wheel 11 and is used for transferring an object 1 from the mandrel wheel 3 through the transfer wheel 11 to a transport device 4. The mandrel wheel 3 is driven to rotate about a rotation axis 3', the transfer wheel 11 is driven to rotate about a rotation axis 11', wherein the rotation axes 3' and 11' are arranged parallel to one another. In the portion of the periphery of the mandrel wheel 3, supports are arranged that are configured as receiving mandrels 5 and in the portion of the periphery of the transfer wheel 11, supports 7 are arranged that are configured as transfer supports. The number of the transfer supports 7 at the transfer wheel, in this embodiment 12, is smaller than the number of the receiving mandrels 5 at the mandrel wheel 3, in this embodiment 24, wherein nine receiving mandrels 5 are visible at the cutout of the mandrel wheel 3 illustrated in the figure. The transfer supports 7 are respectively connected with the transfer wheel 11 through a transfer pivot arm 12, the receiving mandrels 5 are connected with the mandrel wheel 3 respectively through a mandrel pivot arm 19. The pivot axes 13 of the transfer pivot arms 12 respectively extend parallel to the rotation axis 11' of the transfer wheel 11. The pivot axes 13 have the same fixated distance from the rotation axis 11' for each of the transfer supports 7 and are evenly distributed on a circle about the rotation axis 11'. The pivot axes 16 of the mandrel pivot arms 19 extend respectively in parallel with the rotation axis 3' of the mandrel wheel 3. The pivot axes 16 which are associated with the respective mandrel pivot arms 19 have the same fixated distance from the rotation axis 3' and are evenly distributed about the rotation axis 3' on a circle. Compressed air and vacuum are supplied through a rotation point of the mandrel pivot arm 12 arranged on the pivot axis 13 and an opening 24 of the transfer support 7 that is configured as a borehole. The compressed air/vacuum-supply for the receiving mandrel 5 is provided through a rotation point of the mandrel pivot arm 19 arranged on the pivot axes 16 and an opening 23 of the receiving mandrel 5 configured as a borehole.

For illustration purposes, the receiving mandrels 5 and the transfer supports 7 in FIGS. 2 through 6 are respectively illustrated concentrated into a cross.

Figure 2:
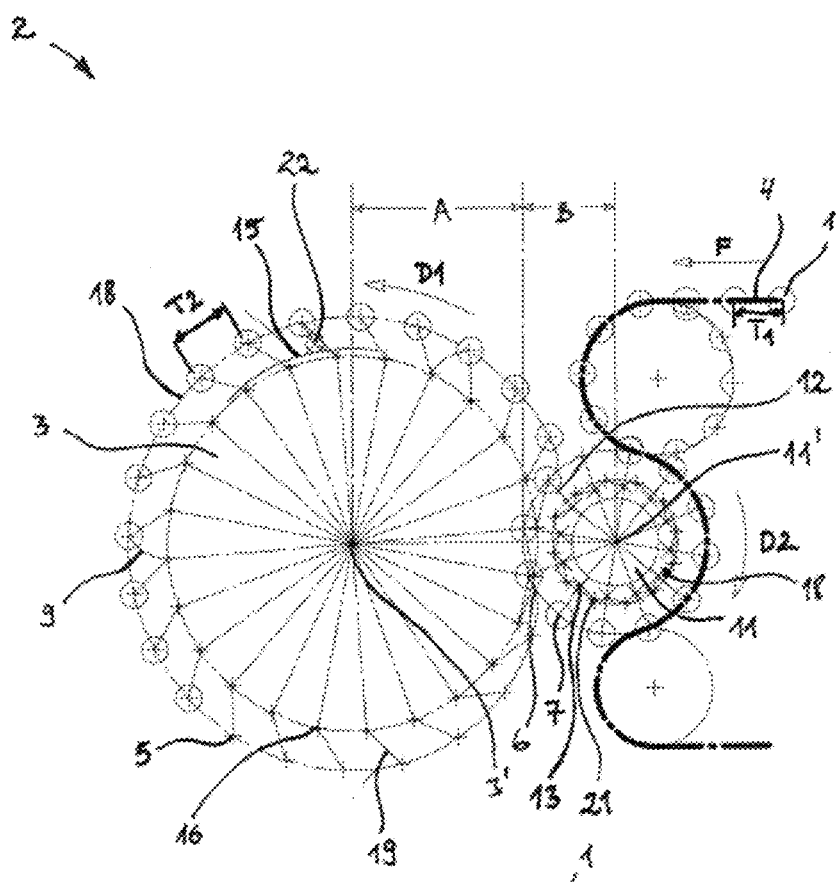
FIG. 2 schematically illustrates an exemplary embodiment of the transfer device according to the invention according to FIG. 1 for illustrating the kinematic context.

The transfer device 2 illustrated in FIG. 2 has the same configurative features as the transfer device 2 illustrated in FIG. 1, thus it is the same embodiment. There is a functional difference only in that the transfer device 2 illustrated in FIG. 1 is used for transferring an object 1 from a mandrel wheel 3 to a transport device 4 and the transfer device 2 illustrated in FIG. 2 is used for transferring an object 1 from a transport device 4 to the mandrel wheel 3. The kinematic context subsequently described with reference to FIGS. 2 and 3 apply accordingly analogously for the transfer device 2 illustrated in FIG. 1.

A transfer device 2 in FIG. 1 includes a mandrel wheel 3 and a transfer wheel 11. The mandrel wheel 3 is driven to rotate about a rotation axis 3' in a rotation direction D1; the transfer wheel 11 is drive to rotate about a rotation axis 11' in a rotation direction D2. The rotation direction D1 is opposite to the rotation direction D2. A transport device 4 which is configured as a chain conveyor continuously feeds the objects 1 that are received by the transport device with a distance pitch T1 with a feed velocity F along a transfer wheel 11. Starting with the point at which the transport device 4 nestles against the transfer wheel 11, the respective object 1 is sucked in by one of the transfer supports 7, wherein the vacuum required for this purpose is provided through the pivot axis 13 of the transfer support 7 and the opening 24 provided in the transfer support 7 and configured as a borehole. With the beginning of the suction process, the object 1 (illustrated in FIG. 8) completely inserted onto a support rod 4' of the chain conveyor 4 is pulled off from the support rod 4'. Thus, the transfer support 7 is movably supported along an axis extending parallel to its pivot axis 13 and the transfer support 7 is deflected accordingly through a thrust control device (not illustrated). The deflection of the transfer support 7 required for completely pulling off the object 1 is predetermined by the overlap length of object 1 and of the support rod 4' of the chain conveyor and is caused by the thrust control device starting from a starting position of the transfer support 7 for a continuing rotation of the object 1 about the transfer wheel 11, the latest, however, when reaching an end of the nestling portion. In the subsequent transport phase an object 1 approaches a transfer path. This transfer path is defined by a common path curve section 6 where a transfer of the object 1 is provided from a transfer support 7 to a corresponding receiving mandrel 5 or vice versa. The distance perpendicular of the rotation axes 3' and 11' intersects the common path curve section 6 in a point P. The length of the distance perpendicular between the point P and the rotation axis 3' represents a minimum distance A of the receiving mandrels 5 from the rotation axis 3' of the mandrel wheel 3. Accordingly, a maximum distance B of the transfer supports 7 from the rotation axis 11' of the transfer wheel 11 is defined by the length of the distance perpendicular between the point P and the rotation axis 11' of the transfer wheel 11. The maximum distance B of the supports 7 from the rotation axis 11' of the transfer wheel 11 is smaller than the minimum distance A of the receiving mandrels 5 from the rotation axis 3' of the mandrel wheel. As already described with reference to FIG. 1 12 supports 7 are arranged at the circumference of the transfer wheel 11 and 24 receiving mandrels 5 are arranged in an annular configuration at the circumference of the mandrel wheel 3. The size of the transfer wheel angle enclosed by the pivot axis 13 of two adjacent supports 7 with the rotation axis 11' as an apex point is 30° accordingly. Analogously, the mandrel wheel angle enclosed by the pivot axis 13 of two adjacent receiving mandrels 5 with the rotation axis 3' as a pivot point is 15°. Accordingly, in the portion of the transfer path defined by the transfer path section 6, a respective constant mandrel wheel angle of 15° and a constant transfer wheel angle of 30° oppose one another. This yields a transmission ratio of 1:2. As a matter of principle, transport devices with a similar configuration can also implement other transmissions. A receiving mandrel 5 connected with the mandrel wheel 3 through a mandrel pivot arm 19 is movable about its pivot axis 16 along a circular support path 9, a support connected with the transfer wheel 11 through a transfer pivot arm 12 is movable about its pivot axis 13. Through superimposing a pivot movement of the receiving mandrel 5 with a tangential relative movement of the transfer support 7, it is achieved that the receiving mandrel 5 and the transfer support 7 pass through the common circular path curve section in a coaxially paired manner. Thus, a pitch compensation from T1 to T2 is provided. The tangential relative movement of the transfer support 7 is provided in that a first frame fixated control curve 14 is associated with the transfer wheel 11 and each transfer pivot arm 12 is respectively connected with a control curve follower 21 which runs along the first frame fixated control curve 14 for a rotation of the transfer wheel 11. Thus, the relative position of the transfer support 7 attached at the transfer pivot arm 12 is determined as a function of the rotation angle of the transfer wheel 11. By the same token, the pivot movement of the receiving mandrel is caused in that a second frame fixated control curve 15 is associated with the mandrel wheel 3 and each mandrel pivot arm 19 is respectively connected with a control curve follower 22 which runs along the second frame fixated control curve 15 for a rotation of the mandrel wheel 3. The relative position of the receiving mandrels 5 attached at the mandrel pivot arm 19 is thus predetermined as a function of the rotation angle of the mandrel wheel 3. In order to provide a transfer of the object 1 from the transfer support 7 to a receiving mandrel 5, the object 1 is pushed onto the receiving mandrel 5 while running through the circular path curve section. This is caused in that the transfer support 7 which is movably supported along an axis extending parallel to the pivot axis 13 of the transfer support is moved through the thrust control device from its deflected position which was assumed when reaching the end of the nestling portion into a position that is more proximal to the receiving mandrel 5. From this point in time, the vacuum that is provided through the opening 24 of the transfer support 7 is turned off and a sucking the respective object 1 in through the receiving mandrel 5 begins, wherein the required vacuum is provided through the pivot axis 16 of the receiving mandrel 5 and the opening 23 provided in the receiving mandrel and configured as a borehole.

Figure 3:
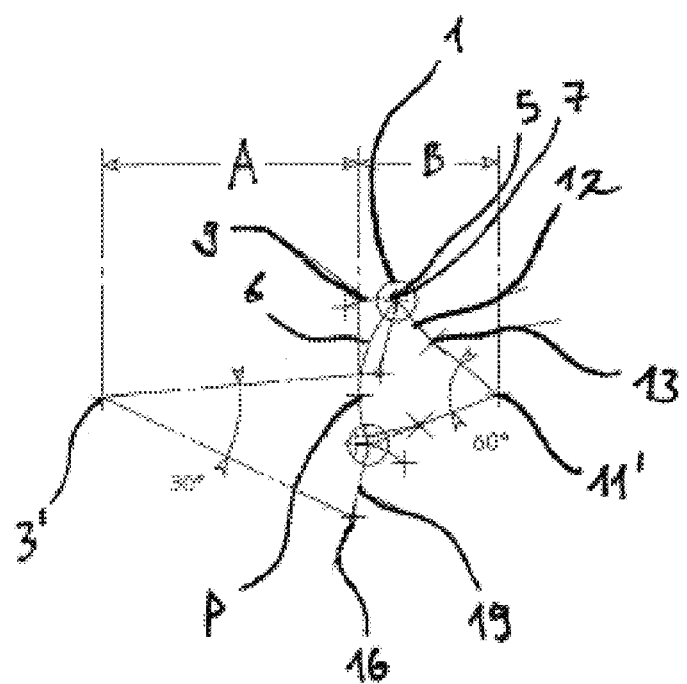
FIG. 3 schematically illustrates a detail of the exemplary embodiment of FIG. 2 with respect to a pitch compensating pivot movement of the transfer pivot arm and the mandrel pivot arm.

The transfer portion described with reference to FIG. 2 and defined through the common path section 6 is illustrated in FIG. 3 in a detail view. Without this being a limitation and for purposes of illustration clarity only every second transfer support 7 or every second receiving mandrel 5 is illustrated and therefore the illustrated transfer wheel angle is 60° and the mandrel wheel angle is 30°. A receiving mandrel 5 is connected with the mandrel wheel 3 (represented by the arms of the mandrel wheel angle with the apex point in the rotation axis 3') through a mandrel pivot arm 19, wherein the receiving mandrel is movable about its pivot axis 16 along a circular support path 9, a support connected with the transfer wheel 11 through a transfer pivot arm 12 is movable about its pivot axis 13. By superimposing a pivot movement of the receiving mandrel 5 with a tangential relative movement of the transfer support 7 it is achieved that the receiving mandrel 5 and the transfer support 7 run through the common circular path curve section 6 coaxially paired.

Figure 4:
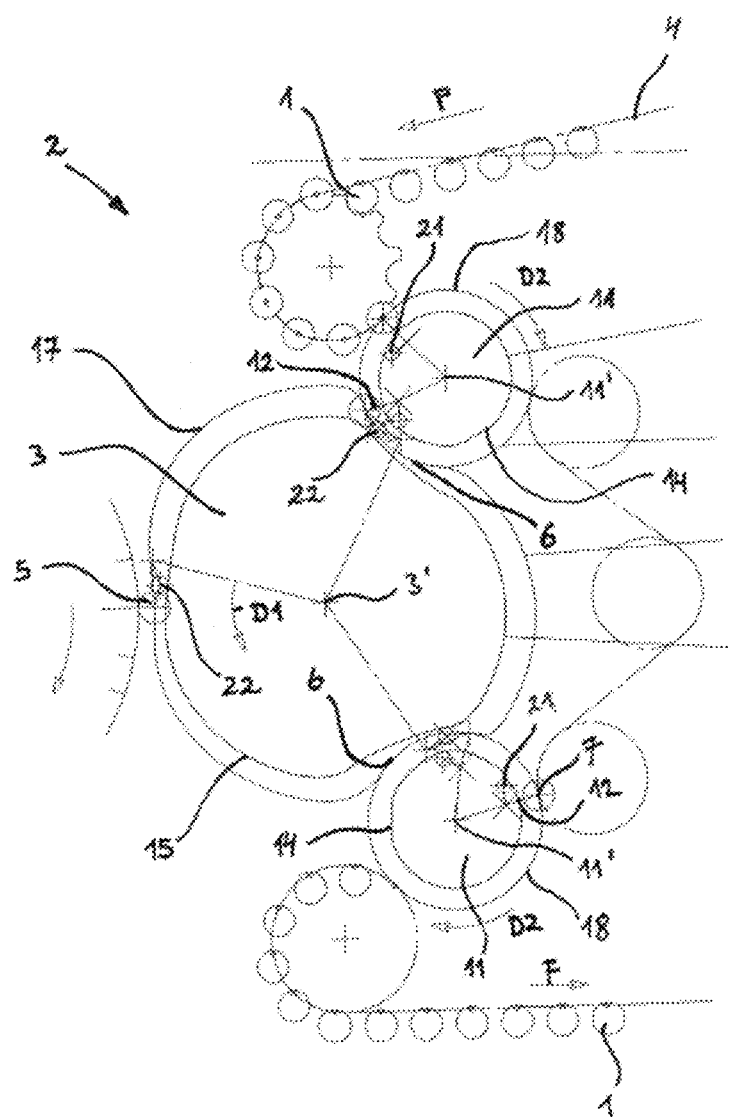
FIG. 4 schematically illustrates an exemplary embodiment of a transfer device according to the invention with two transfer wheels.

The transfer device 2 illustrated in FIG. 4 includes two identical transfer wheels 11, one for transferring an object 1 to be processed from a transport device 4 to a mandrel wheel 3, a second one for transferring the object 1 to be processed from the mandrel wheel 3 to the transport device 4. The analog figure description applies to FIG. 1 through FIG. 3. A first frame fixated control curve 14 is respectively associated with the transfer wheel 11. The transfer pivot arms 12 of the transfer wheel 11 are respectively connected with a control curve follower 21, so that the frame fixated control curve 14 and the control curve followers 21 through rotation of the transfer wheel 11 about its rotation axis 11' cause a movement of the supports 7 attached at the transfer pivot arms 12 along a support path 11 that is closed about the rotation axis 11'. Furthermore, a second frame fixated control curve 15 is associated with the mandrel wheel 3. Each mandrel pivot arm 19 of the mandrel wheel 3 is respectively connected with the control curve follower 22, so that the frame fixated control curve 15 and the control curve followers 22 cause a movement of the receiving mandrel 5 attached at the respective mandrel pivot arm 19 along a receiving mandrel path 17 that is closed about the rotation axis 3' through the rotation of the mandrel wheel 3 about its rotation axis 3'.

FIGS. 5a through 5d illustrate in three snapshots how on the one hand side the control curve follower 21 rolls on the frame fixated control curve 14 of the transfer wheel 11 and thus moves the transfer pivot arm 12 in the transfer portion and on the other hand side how the control curve follower 22 rolls on the frame fixated control curve 15 of the mandrel wheel 3 and thus moves the respective mandrel pivot arm 19 in the transfer portion. However, respectively, only a single control curve follower and the associated pivot arm are illustrated. Also the frame fixated control curves 14 and 15 are only illustrated in sections.

Figure 5B:
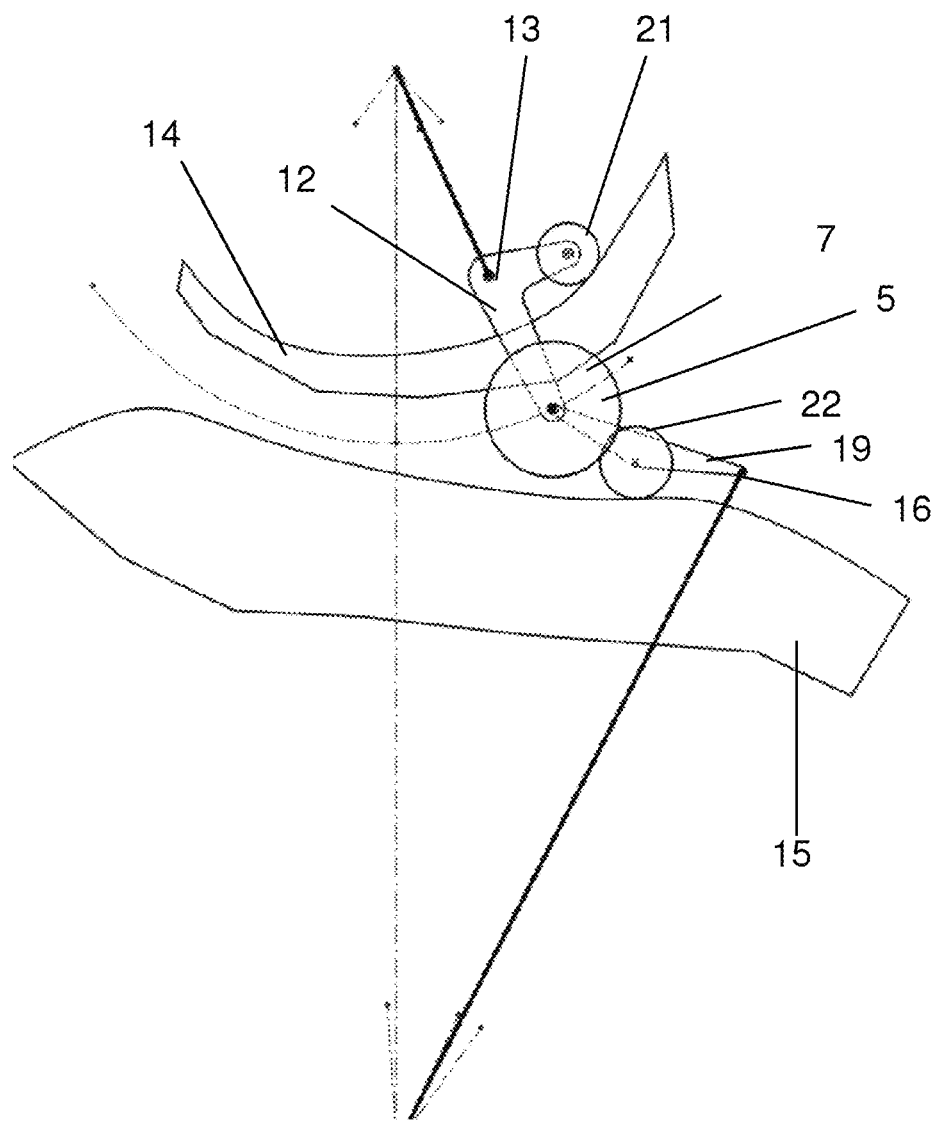
Figure 5C:
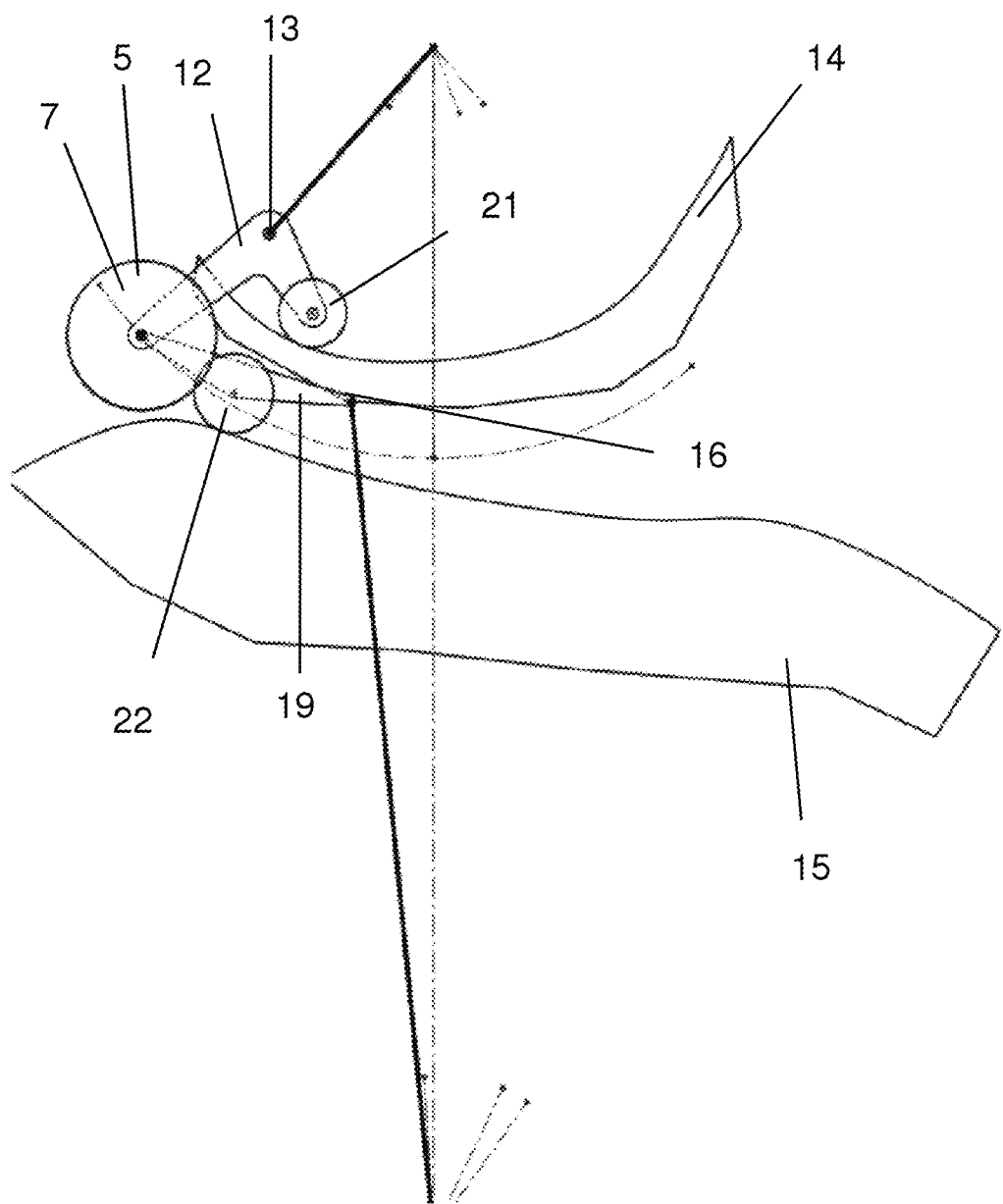
Figure 5D:
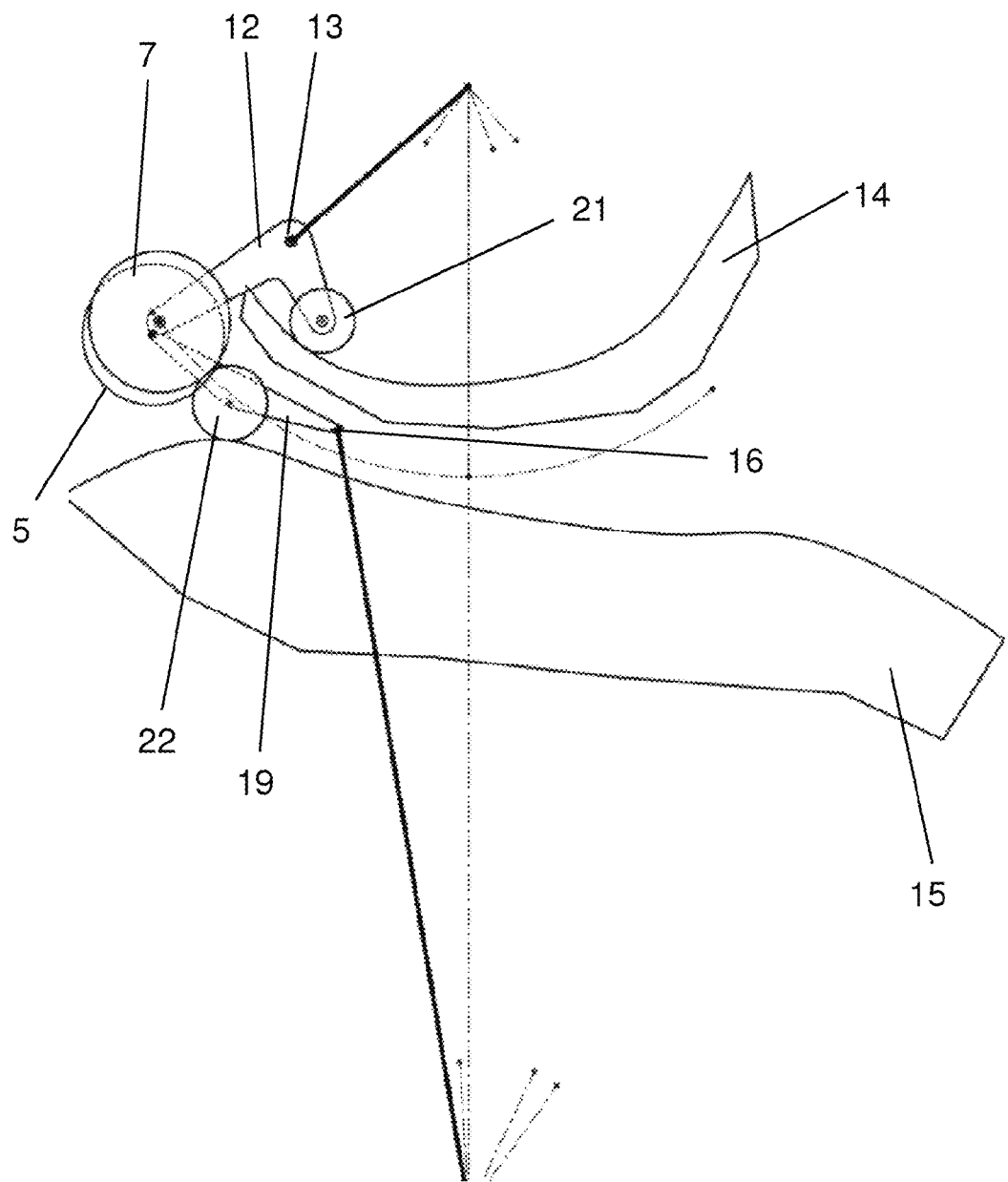

FIG. 5a illustrates how the transfer support 7 at the transfer pivot arm 12 is initially at a particular distance from the receiving mandrel 5 at the mandrel pivot arm 19. FIG. 5b illustrates that the path curves of the transfer support 7 and of the receiving mandrel 5 in the common path section 6 between the point in time illustrated in FIG. 5b and the point in time illustrated in FIG. 5c overlap. FIG. 5d illustrates eventually how the transfer support 7 and the receiving mandrel 5 eventually are removed from each other again.

Figure 6:
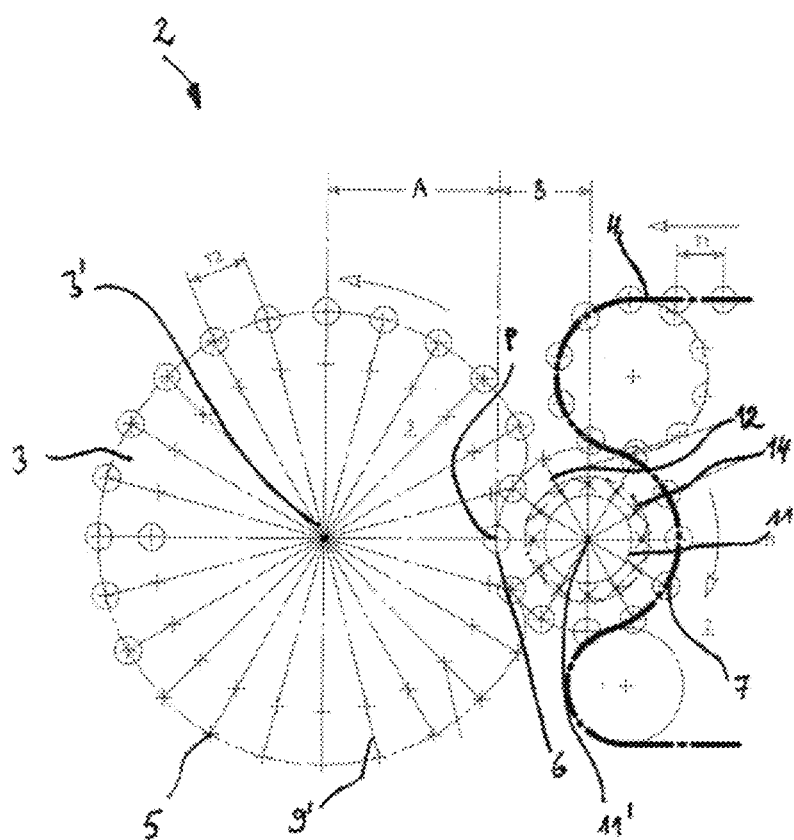
FIG. 6 schematically illustrates another exemplary embodiment of a transfer device according to the invention, wherein the transfer wheel includes a transfer pivot arm and the mandrel wheel includes a straight line support.

The alternative embodiment of a transfer device 2 illustrated in FIG. 6 differs from the embodiment illustrated in FIG. 2 in that the receiving mandrels 5 are respectively attached at a straight line guide 9'. The longitudinal axis of the respective straight line guide 9' extends transversal to the rotation axis 3' of the mandrel wheel 3. The straight line supports 9' at the mandrel wheel 3 facilitate moving the receiving mandrels attached thereto between a minimum distance A and a maximum distance from the rotation axis 3' along a straight support path defined by the straight supports 9'. The distance perpendicular of the rotation axes 3' and 11' intersects the common path curve section 6 in a point P. The length of the distance perpendicular between the point P and the rotation axis 3' represents a minimum distance A of the receiving mandrels 5 from the rotation axis 3' of the mandrel wheel 3. Accordingly, a maximum distance B of the supports 7 from the rotation axis 11' of the transfer wheel 11 is determined by the length of the distance perpendicular between the point P and the rotation axis 11' of the transfer wheel 11. The maximum distance B of the supports 7 from the rotation axis 11' of the transfer wheel 11 is smaller than the minimum distance A of the transfer mandrels 5 from the rotation axis 3' of the mandrel wheel 3. In this alternative embodiment, a third frame fixated control curve (not illustrated) is associated with the mandrel wheel 3. The straight line guides 9' of the mandrel wheel 3 are respectively connected with a control curve follower so that the third frame fixated control curve and the control curve followers cause a rotation of the receiving mandrels 5' attached at the straight line guides 9' along a receiving mandrel path that is closed about the rotation axis 3' through a rotation of the mandrel wheel 3 about its rotation axis 3'. Through a superposition of a straight guided movement of the receiving mandrel 5 with a tangential relative movement of the transfer support 7 it is facilitated that the receiving mandrel 5 and the transfer support 7 run through the common circular path curve section 6 in a coaxially paired manner. The tangential relative movement of the transfer support 7 is caused in that a first frame fixated control curve 14 is associated with the transfer wheel 11 and each transfer pivot arm 12 is respectively connected with a control curve follower 21 which runs along the first frame fixated control curve 14 when the transfer wheel 11 rotates. A pitch compensation from T1 to T2 is thus provided.

Figure 7:
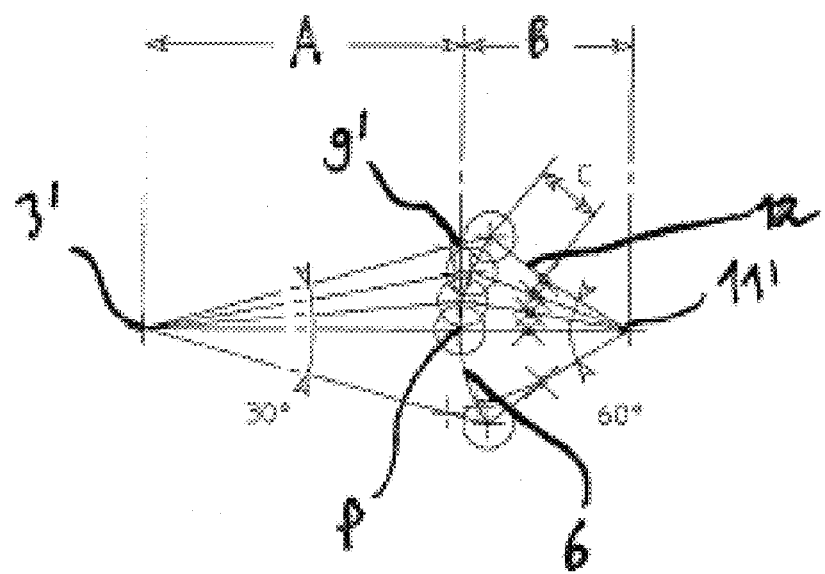
FIG. 7 schematically illustrates a detail of the exemplary embodiment of FIG. 5 with respect to a partition compensating pivot movement of the transfer pivot arm and the straight line movement of the straight line support.

FIG. 7 illustrates a detail of the exemplary embodiment of FIG. 6 with respect to a pitch compensating pivot movement of the transfer pivot arm 12 and of the straight movement of the straight line guide 9'. Without representing a limitation and for illustration purposes intermediary positions of the transfer supports 7 or of the receiving mandrel 5 are illustrated. In order to facilitate a comparison of the kinematics with the kinematics in FIG. 3, the transfer wheel angle is illustrated at 60°, the mandrel wheel angle is illustrated at 30°. A receiving mandrel 5 connected with the mandrel wheel 3 (represented by the arms of the mandrel wheel angle with the pivot point in the rotation axis 3') is movable through a straight line guide 9' along its straight line support path which extends identical with the straight line support path of the straight line guide 9, a support connected with the transfer wheel 11 through a transfer pivot arm 12 is movable about its pivot axis 13. Through superimposing a straight line guide movement of the receiving mandrel 5 with a tangential relative movement of the transfer support 7, it is facilitated that the receiving mandrel 5 and the transfer support 7 run through the common circular path curve section 6 in a coaxially paired manner.

Figure 8A:
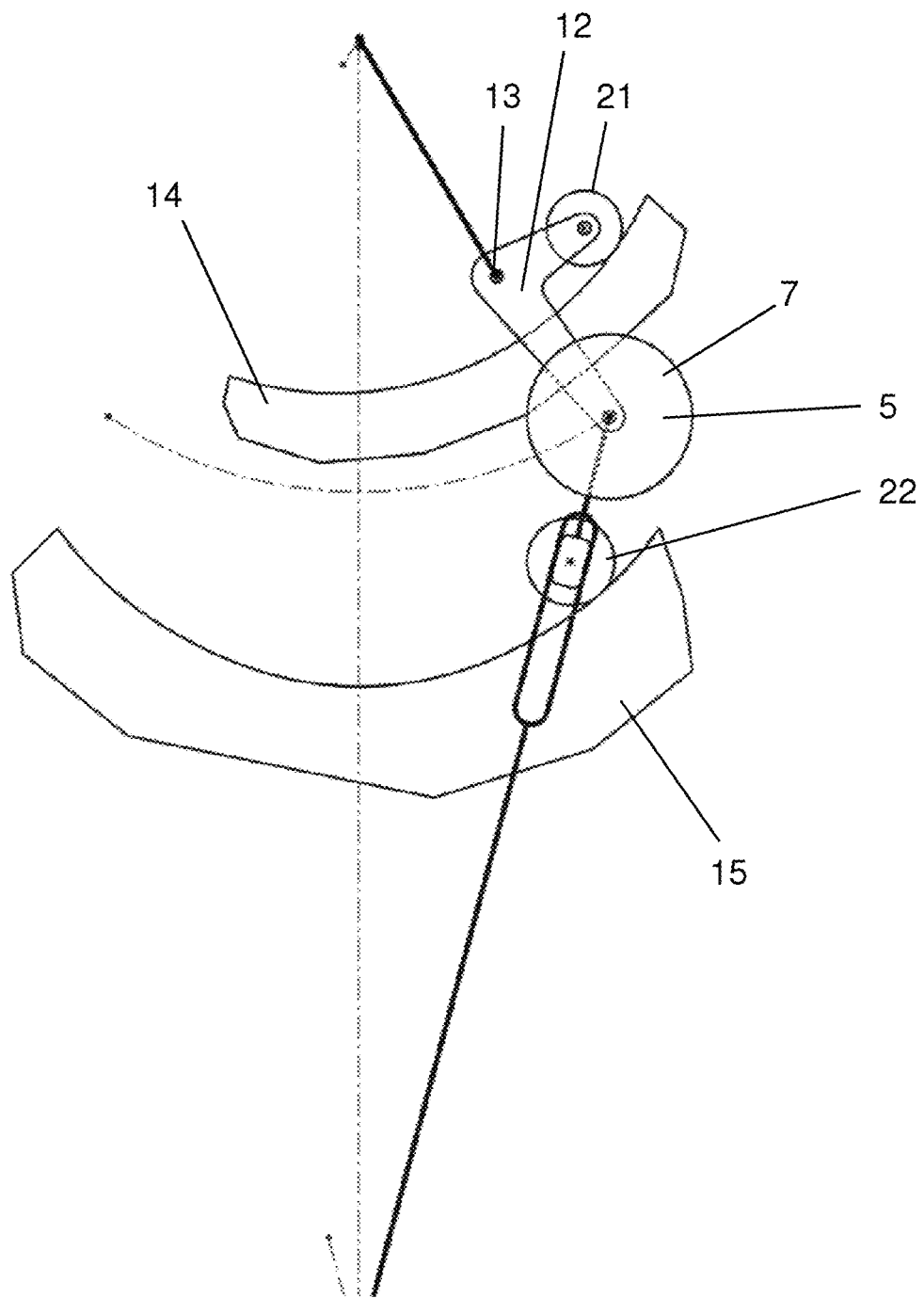
FIG. 8a-c schematically illustrate various snapshots for depicting the movement of the transfer supports and the receiving mandrel in the transfer portion.
Figure 8B:
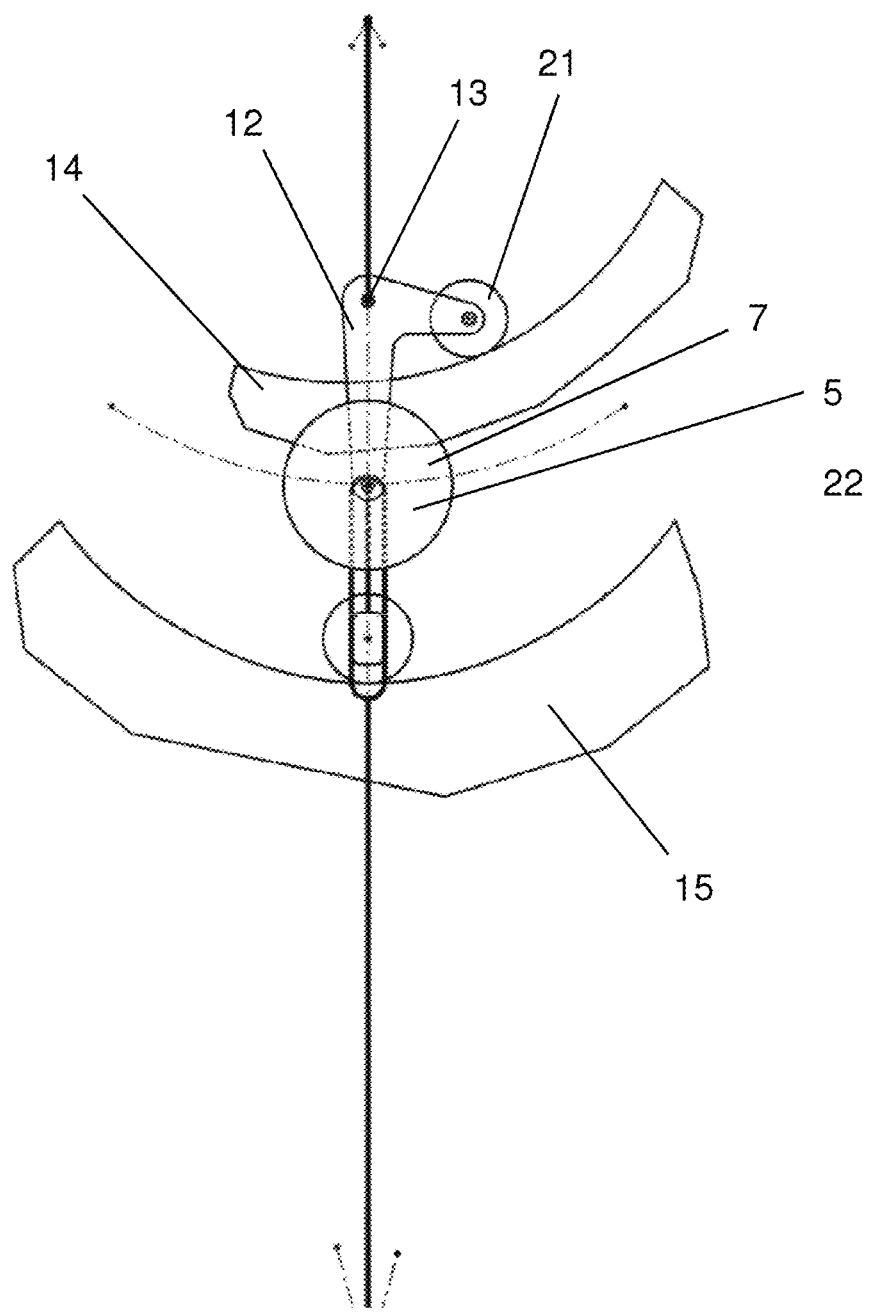
Figure 8C:
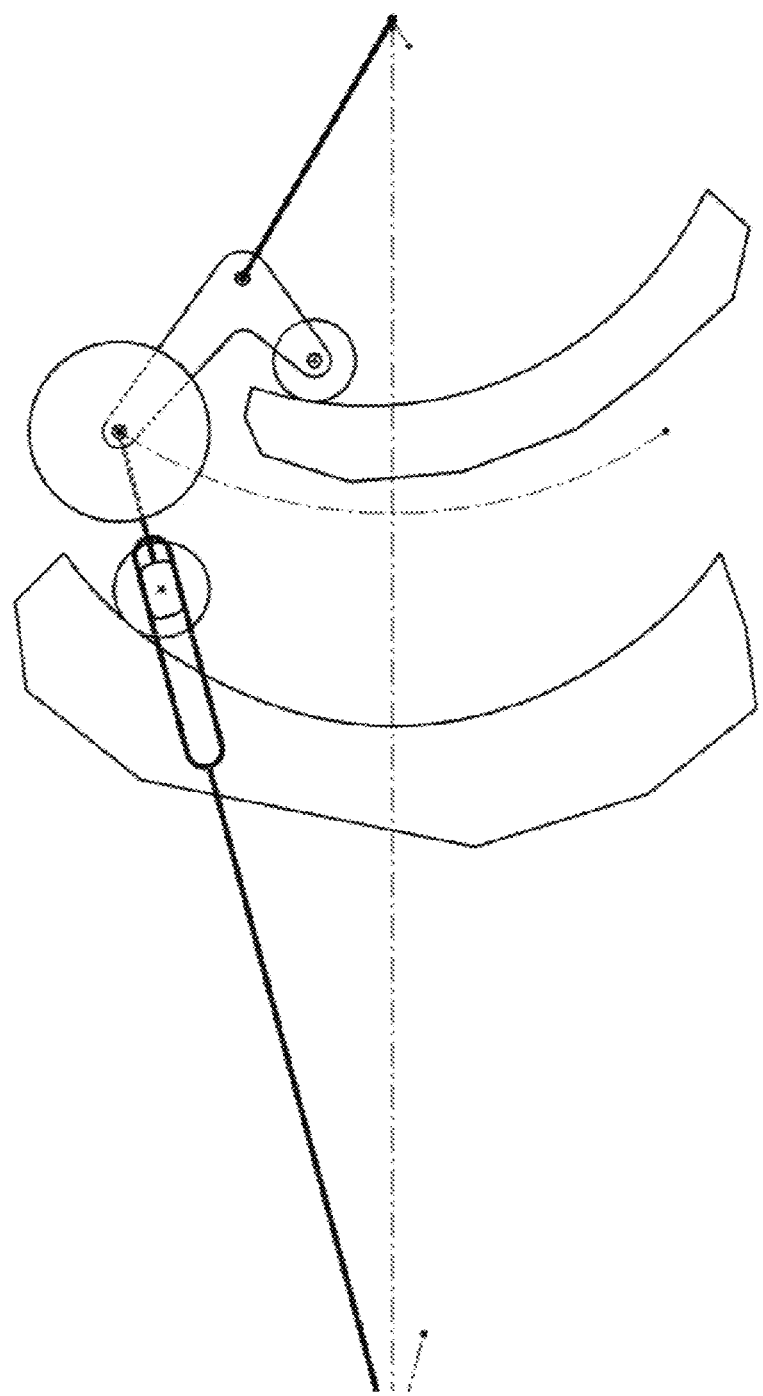

FIGS. 8a through 8c illustrate in three snapshots how the receiving mandrel 5 and the transfer support 7 run through a common path section 6 in the configuration variant illustrated in FIG. 6 and FIG. 7. In particular, FIGS. 8a through 8d illustrate section of the third frame fixated control curve 15' and the associated control curve follower 22' which jointly cause the linear deflection of the receiving mandrels 5 along the respective straight line support 9'. As illustrated in FIGS. 5a through 5d, the positions of the transfer supports 7 are simultaneously controlled through a respective first frame fixated control curve 14' and the control curve followers 21 rolling thereon, wherein the control curve follower 21 is connected through the respective transfer pivot arm 12 with the respective transfer support 7.

Figure 9A:
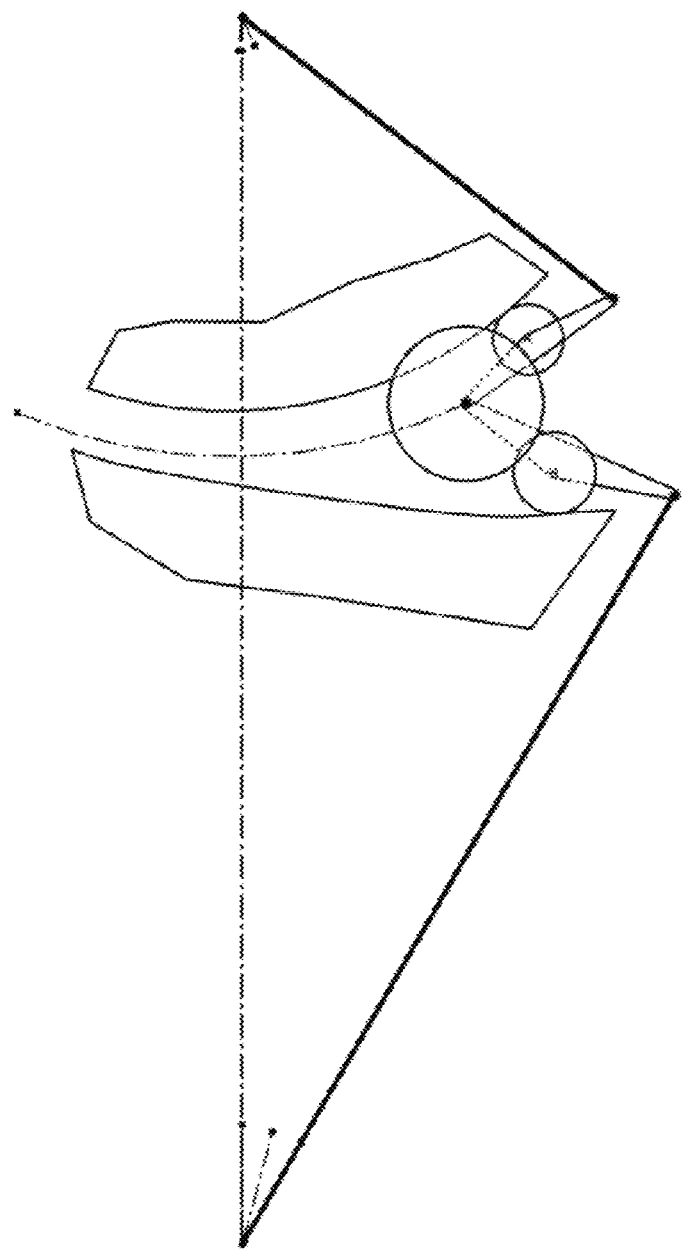
FIG. 9a, b schematically illustrate various snapshots for depicting the movement of transfer supports and receiving mandrel in the transfer portion and another alternative embodiment.
Figure 9B:
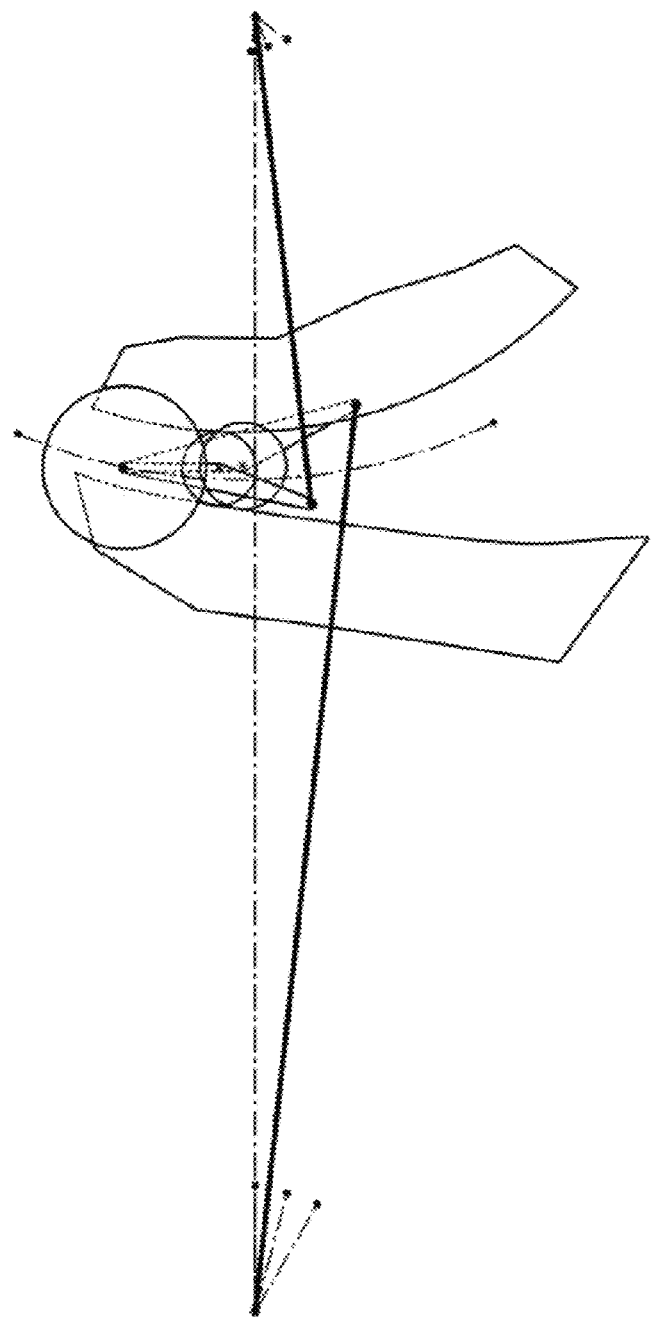

Additional alternative embodiments include a case in which the mandrel wheel and also the transfer wheel respectively have linear guides as it is known in the art. By the same token, as a matter of principle, also other embodiments of mandrel wheel and transfer wheel are conceivable in which the respective pivot arms, control curves and control curve followers are configured differently. An embodiment of this type is illustrated in FIG. 9. Also here it is possible as a matter of principle that straight line supports are provided at the transfer wheel and pivot arms are provided at the mandrel wheel.

Figure 10:
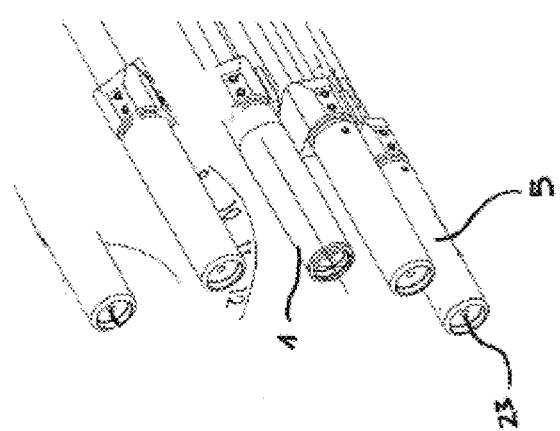
FIG. 10 schematically illustrates a receiving mandrel with an opening which is configured for supplying compressed air/vacuum.

A receiving mandrel 5 in FIG. 10 includes an opening 23 that is configured as a borehole wherein the opening is provided for feeding compressed air/vacuum.

Figure 11:
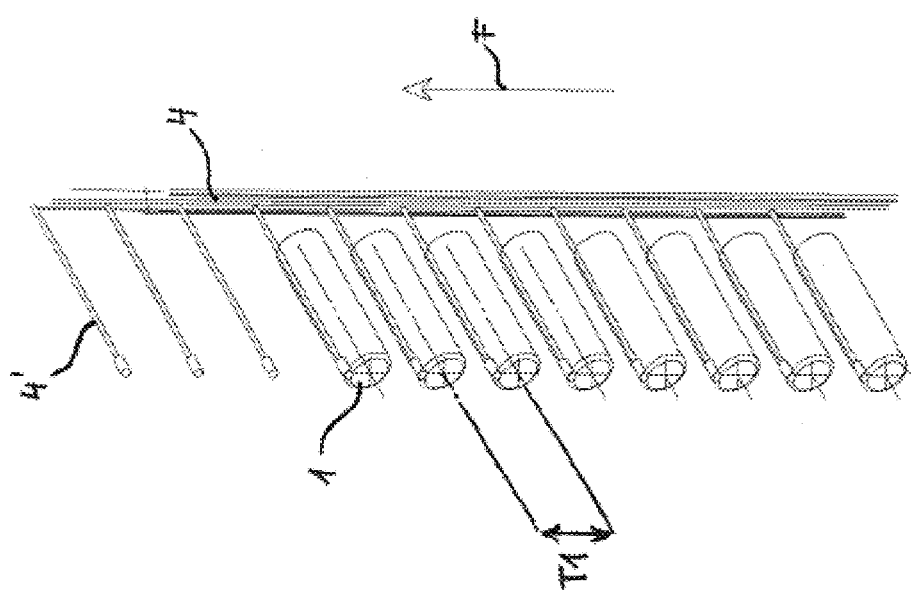
FIG. 11 schematically illustrates a transfer device with an object received therein.

A transport device 4 illustrated in FIG. 11 is configured as a chain conveyor and conveys the objects 1 received by the support rods 4' with a pitch T1 with a feed velocity F.

Figure 12:
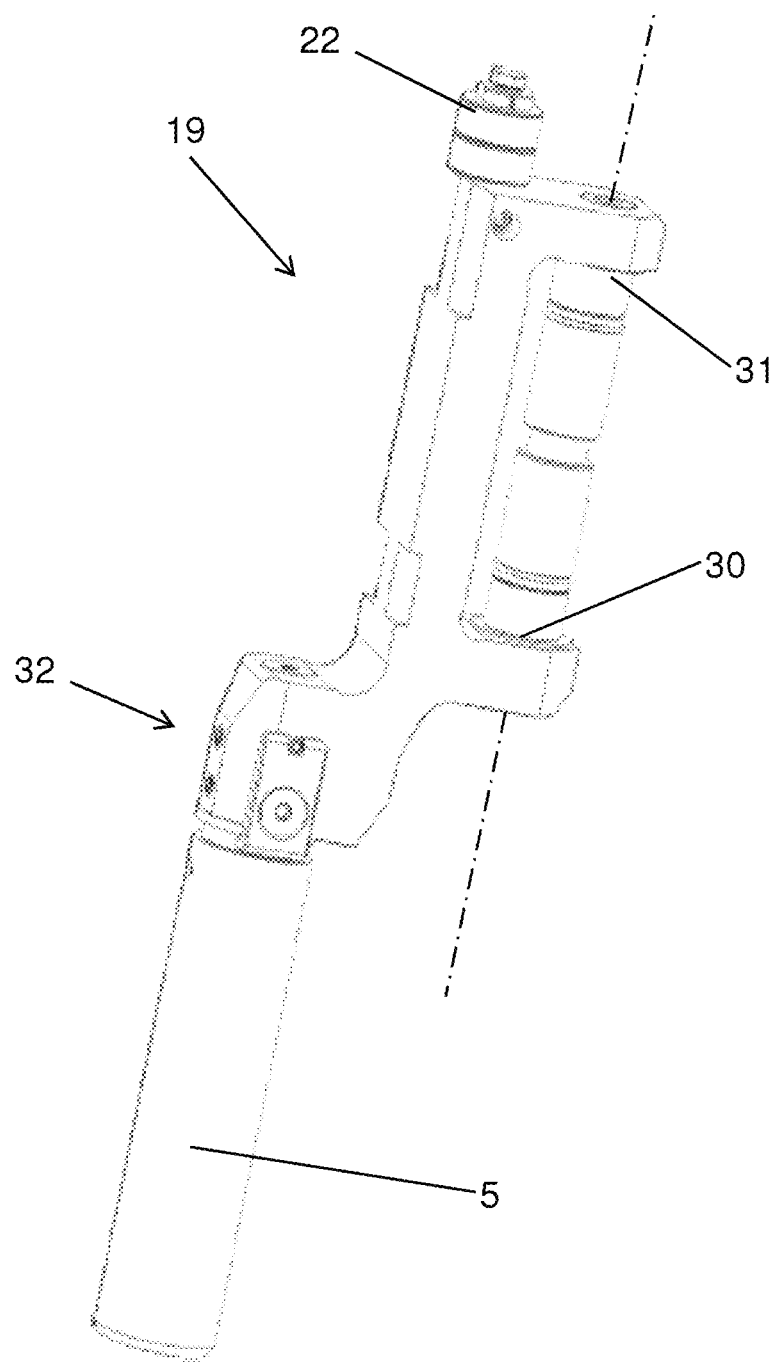
FIG. 12 schematically illustrates a lateral view of a mandrel pivot arm.

FIG. 12 eventually illustrates a schematic lateral view of a mandrel pivot arm 19. The pivot axis is drawn in a dash-dotted line. It is apparent that the mandrel pivot arm 19 includes two pivot bearings 30 and 31 disposed at an axial distance from one another. The mandrel pivot arm 19 is configured with an elbow so that each free end 32 of the mandrel pivot arm 19 at which a respective receiving mandrel is arranged has an axial distance from the pivot bearing 31. Through this elbow arrangement of the mandrel pivot arms, the mandrel pivot arms can be distributed over the circumference of the mandrel wheel 3, with a tighter spacing as illustrated in FIGS. 1 and 2. Furthermore, the control curve follower 22 of the mandrel pivot arm 19 is on the same side of the pivot axis as a free end 32 of the mandrel pivot arm 19 at which the receiving mandrel 5 is attached. This way, the moments provided between the control curve follower 22 and the receiving mandrel 5 and thus respective deformations of the mandrel pivot arm 19 are kept to a minimum.

Figure 13:
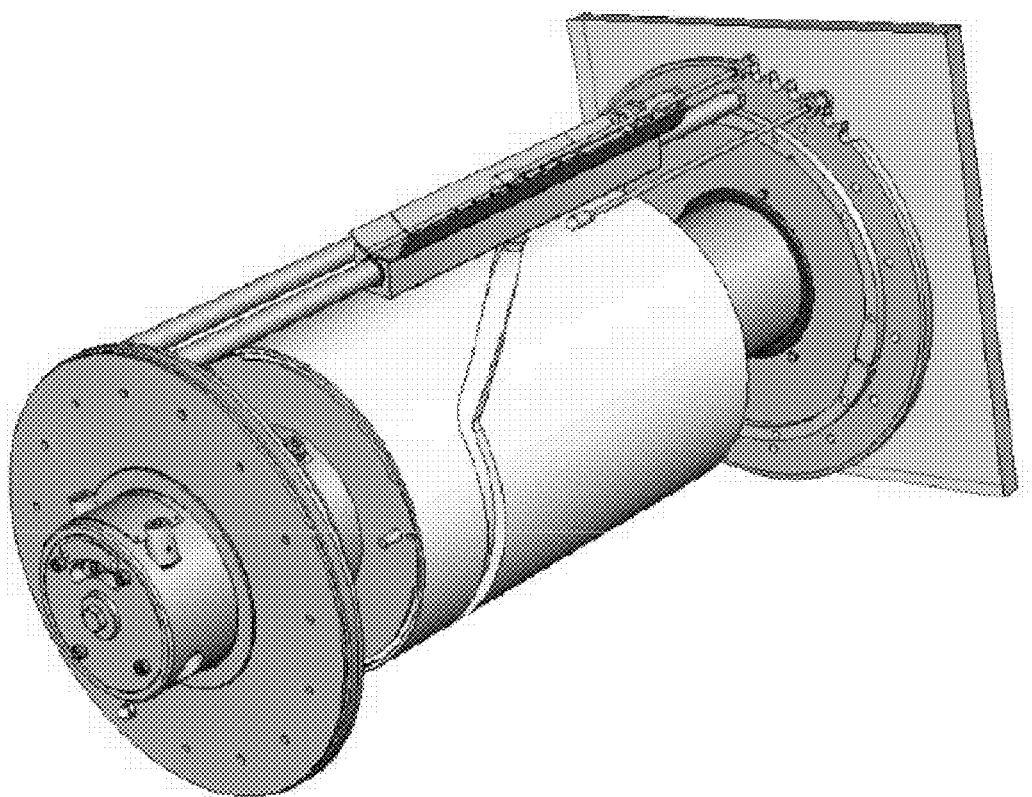
FIG. 13 schematically illustrates a first arrangement of a lifting curve for axially moving the transfer supports.
Figure 14:
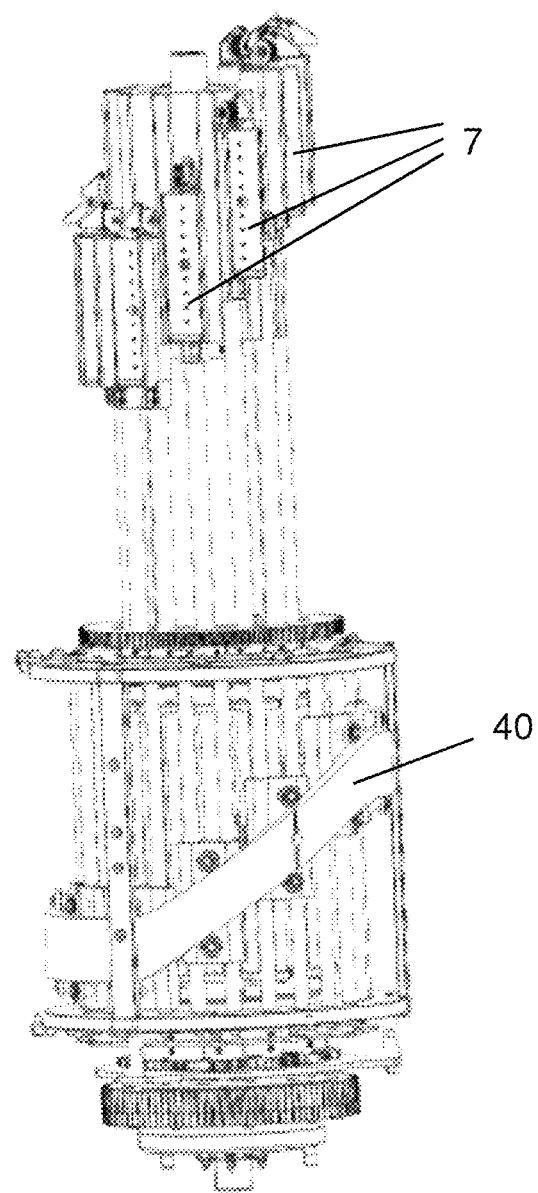
FIG. 14 schematically illustrates a second preferred arrangement of a lifting curve for axially moving the transfer supports.

FIGS. 13 and 14 schematically illustrate two alternative arrangements of a lifting curve 40 through which the transfer supports 7 can be moved in their longitudinal directions in order to receive elements from a respective receiving mandrel or to slide elements onto a respective receiving mandrel.

FIG. 13 illustrates a solution in which the respective lift curve is arranged between the transfer supports. Since the path of the lift curve must not exceed particular pitches, the lift curve necessarily also has a particular minimum diameter when it is intended to cause a particular lift. This has the effect that the transfer wheel of the embodiment illustrated in FIG. 13 has a rather large diameter since the transfer supports are arranged outside of the lift curve 40.

FIG. 14 illustrates an advantageous embodiment in which the lift curve is not arranged between the transfer supports but axially offset in drive direction of the transfer wheel relative to the transfer supports. This way, the diameter of the transfer wheel and the diameter of the associated lift curve can be selected independently from one another for lifting and lowering the transfer supports in the transfer wheel.

What is claimed is:
1. A transfer device, comprising:
 a mandrel wheel; and
 a transfer wheel,
 respectively driven to rotate about rotation axes that are parallel to one another and
 which respectively include supports in their peripheries for objects to be imprinted or processed otherwise,
 wherein the supports at the mandrel wheel pivot so that a distance of the supports at the mandrel wheel from a rotation axis of the mandrel wheel is variable between a minimum distance and a maximum distance, and the mandrel wheel and the transfer wheel are arranged adjacent to one another so that objects are transferrable from a transport device through the transfer wheel to a respective support at the mandrel wheel or vice versa from the mandrel wheel through the transfer wheel to a transport device, wherein the supports are respectively attached to the transfer wheel through a transfer pivot arm so that they are pivotable about a pivot axis, wherein the pivot axis extends parallel to the rotation axis of the transfer wheel and the pivot axis has the same fixated distance from the rotation axis for each of the supports, wherein control devices are included which cause a support at the transfer wheel transferring an object and a support at the mandrel wheel receiving the object to run through a common path curve section in a transfer portion for an identical path velocity, wherein the path curve section is circular or substantially circular.

2. The transfer device according to claim 1, wherein a maximum distance of the supports from the rotation axis of the transfer wheel is smaller than the minimum distance of the supports at the mandrel wheel from the rotation axis of the mandrel wheel.

3. The transfer device according to claim 1, wherein a number of the supports at the transfer wheel is smaller than a number of the supports at the mandrel wheel.

4. The transfer device according to claim 1, wherein the pivot axes of the transfer pivot arm at the transfer wheel are evenly distributed on a circle about the rotation axis of the transfer wheel.

5. The transfer device according to claim 1,
wherein the supports are connected with the mandrel wheel respectively through a mandrel pivot arm whose pivot axis extends parallel to the rotation axis of the mandrel wheel and which has for each of the supports at the mandrel wheel the same fixated distance from the rotation axis of the mandrel wheel, wherein the mandrel pivot arms at the mandrel wheel cause/facilitate a movement of the supports attached at the mandrel pivot arms between their minimum distance and their maximum distance to the rotation axis along a circular support path.

6. The transfer device according to claim 1,
wherein the supports are attached at the mandrel wheel respectively at a straight line guide whose longitudinal axis extends transversal to the rotation axis of the mandrel wheel, wherein the straight line guides at the mandrel wheel cause/facilitate a movement of the supports attached at the straight line guides between their minimum distance and their maximum distance from the rotation axis along a straight line support path.

7. A transfer device comprising:
a mandrel wheel; and
a transfer wheel,
respectively driven to rotate about rotation axes that are parallel to one another and
which respectively include supports in their peripheries for objects to be imprinted or processed otherwise,
wherein the supports at the mandrel wheel pivot so that a distance of the supports at the mandrel wheel from a rotation axis of the mandrel wheel is variable between a minimum distance and a maximum distance, and
the mandrel wheel and the transfer wheel are arranged adjacent to one another so that objects are transferrable from a transport device through the transfer wheel to a respective support at the mandrel wheel or vice versa from the mandrel wheel through the transfer wheel to a transport device, wherein the supports are respectively attached to the transfer wheel through a transfer pivot arm so that they are pivotable about a pivot axis, wherein the pivot axis extends parallel to the rotation axis of the transfer wheel and the pivot axis has the same fixated distance from the rotation axis for each of the supports, wherein control devices are included which cause a support at the transfer wheel transferring an object and a support at the mandrel wheel receiving the object to run through a common path curve section in a transfer portion for an identical path velocity, wherein the path curve section is circular or substantially circular, and wherein a first frame fixated control curve is associated with the transfer wheel and a respective control curve follower is associated with the transfer pivot arms of the transfer wheel so that the frame fixated control curve and the control curve follower through the rotation of the transfer wheel about its rotation axis cause a movement of the supports attached at the transfer pivot arms along a support path that is closed about the rotation axis.

8. The transfer device according to claim 1,
wherein a second frame fixated control curve is associated with the mandrel wheel and a respective control curve follower is associated with the mandrel pivot arm of the mandrel wheel so that the frame fixated control curve and the control curve follower through rotation of the mandrel wheel about its rotation axis cause a movement of the supports attached at the mandrel pivot arm along a receiving mandrel path that is closed about the rotation axis.

9. The transfer device according to claim 1, wherein a second frame fixated control curve is associated with the mandrel wheel and a respective control curve follower is associated with the straight line guide of the mandrel wheel so that the frame fixated control curve and the control curve follower through the rotation of the mandrel wheel about its rotation axis cause a movement of the supports attached at the straight line guide along a receiving mandrel path that is closed about the rotation axis.

10. The transfer device according to claim 1, wherein the supports at the transfer wheel and/or the supports at the mandrel wheel are configured to suck in an object through vacuum and/or expel to the object through compressed air.

11. The transfer device according to claim 1, wherein the supports at the transfer wheel and/or the supports at the mandrel wheel respectively include an opening which is configured for providing compressed air/vacuum.

12. The transfer device according to claim 1, wherein a compressed air-/vacuum supply to the supports at the transfer wheel and/or to the supports at the mandrel wheel is respectively provided through their pivot axes.

13. The transfer device according to claim 1, wherein the supports at the transfer wheel are respectively supported movable along an axis that extends parallel to a pivot axis of the supports.

14. A transfer device comprising:
a mandrel wheel; and
a transfer wheel,
respectively driven to rotate about rotation axes that are parallel to one another, and which respectively include supports in their peripheries for objects to be imprinted or processed otherwise, wherein a distance of the supports at the mandrel wheel from a rotation axis of the mandrel wheel is variable between a minimum distance and a maximum distance, and the mandrel wheel and the transfer wheel are arranged adjacent to one another so that objects are transferrable from a transport device through the transfer wheel to a respective support at the mandrel wheel or vice versa from the mandrel wheel through the transfer wheel to a transport device, wherein the supports are respectively attached to the transfer wheel through a transfer pivot arm so that they are pivotable about a pivot axis, wherein the pivot axis extends parallel to the rotation axis of the transfer wheel and the pivot axis has the same fixated distance from the rotation axis for each of the supports, wherein thrust control devices are included which cause the supports at the transfer wheel to be respectively deflected along an axis extending parallel to the pivot axis of the supports, wherein the amount of deflection is a function of the rotation angle of the transfer wheel.

\* \* \* \* \*